US011023581B2

(12) United States Patent
Ashey et al.

(10) Patent No.: US 11,023,581 B2
(45) Date of Patent: Jun. 1, 2021

(54) CODE PACKAGE VARIANTS

(71) Applicant: Hewlett-Packard Development Company, L.P., Houston, TX (US)

(72) Inventors: Brandon R Ashey, Boise, ID (US); Chris R Gunning, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 306 days.

(21) Appl. No.: 16/097,580

(22) PCT Filed: Jul. 28, 2016

(86) PCT No.: PCT/US2016/044499
§ 371 (c)(1),
(2) Date: Oct. 29, 2018

(87) PCT Pub. No.: WO2018/022065
PCT Pub. Date: Feb. 1, 2018

(65) Prior Publication Data
US 2019/0156029 A1 May 23, 2019

(51) Int. Cl.
*G06F 21/56* (2013.01)
*G06F 21/57* (2013.01)
(Continued)

(52) U.S. Cl.
CPC ............ *G06F 21/563* (2013.01); *G06F 21/57* (2013.01); *H04L 9/0643* (2013.01); *H04L 9/3247* (2013.01); *H04L 63/1466* (2013.01)

(58) Field of Classification Search
CPC ........ G06F 21/563; G06F 21/57; G06F 21/56; H04L 9/0643; H04L 9/3247; H04L 63/1466
(Continued)

(56) References Cited

U.S. PATENT DOCUMENTS

| 7,512,936 B2 | 3/2009 | Schneider et al. |
| 8,312,941 B2 | 11/2012 | Mirchandani et al. |
| 8,321,941 B2 * | 11/2012 | Tuvell ................ H04W 12/128 726/24 |

(Continued)

FOREIGN PATENT DOCUMENTS

| KR | 2003-0071750 | 9/2003 |
| KR | 1020120052406 | 5/2012 |

(Continued)

OTHER PUBLICATIONS

Software Diversification: What it is and Why it's Important, Nov. 25, 2014, http://www.whitecryption.com/blog ~ 4 pages.

*Primary Examiner* — Farid Homayounmehr
*Assistant Examiner* — Sanchit K Sarker
(74) *Attorney, Agent, or Firm* — Brooks Cameron & Huebsch PLLP

(57) ABSTRACT

Example implementations relate to code package variants. For example, a system according to the present disclosure, may include a client server, a development environment, a digital signing environment, and a central server. The development environment may generate a plurality of variants of a first portion of a code package. The digital signing environment may create a distinct digital signature for each variant of the plurality of variants of the first portion of the code package along with a same second portion of the code package. The central server may transmit to the client server a complete code package comprising a variant of the plurality of variants of the first portion of the code package along with the second portion of the code package and a corresponding digital signature. The central server may transmit to the client server an incomplete code package comprising a remainder of the plurality of variants of the first portion of the code package, without the second portion of the code package, and digital signatures of each of the remainder of the plurality of variants.

14 Claims, 3 Drawing Sheets

(51) Int. Cl.
*H04L 9/06* (2006.01)
*H04L 9/32* (2006.01)
*H04L 29/06* (2006.01)

(58) Field of Classification Search
USPC ......................................................... 726/22
See application file for complete search history.

(56) References Cited

U.S. PATENT DOCUMENTS

| | | | |
|---|---|---|---|
| 8,584,109 B2 | 11/2013 | Anckaert et al. | |
| 8,832,448 B2 | 9/2014 | Wu et al. | |
| 8,918,768 B2 | 12/2014 | Chevallier-Mames et al. | |
| 9,122,876 B2 | 9/2015 | Batke et al. | |
| 2005/0188203 A1* | 8/2005 | Bhaskaran | G06F 21/125 |
| | | | 713/176 |
| 2009/0024993 A1* | 1/2009 | Reus | G06F 8/60 |
| | | | 717/177 |
| 2009/0063620 A1* | 3/2009 | Hanna | G06F 21/105 |
| | | | 709/203 |
| 2009/0083268 A1* | 3/2009 | Coqueret | G06F 8/71 |
| 2010/0217964 A1* | 8/2010 | Peterka | G01R 31/31719 |
| | | | 713/2 |
| 2011/0055585 A1* | 3/2011 | Lee | H04L 9/0844 |
| | | | 713/183 |
| 2012/0151528 A1* | 6/2012 | Mathews | H04N 21/26283 |
| | | | 725/41 |
| 2012/0331307 A1* | 12/2012 | Fernandez Gutierrez | ................ G06F 12/0897 |
| | | | 713/190 |
| 2014/0007074 A1* | 1/2014 | Sporkert | G06F 8/658 |
| | | | 717/172 |

FOREIGN PATENT DOCUMENTS

| | | |
|---|---|---|
| WO | WO-0152471 A1 | 7/2001 |
| WO | WO-2014052028 A1 | 4/2014 |

* cited by examiner

CODE PACKAGE VARIANTS

BACKGROUND

A cyber-attack may exploit an attack vector present in a code image residing in a device on a network. A strategy to reduce the effectiveness of a cyber-attack may include employing code diversity across devices on a network. A code diversity strategy may reduce the number of devices on a network that an attacker may target in the event that they discover an attack vector in a single code image.

DETAILED DESCRIPTION

Diversifying code images for installations among devices across a network may decrease the prevalence of attack vectors that may be exploited by a cyber-attack on the network. For example, some approaches to code diversity may reduce the probability that the same attack vector exists in multiple code images for a device by creating multiple variants of the code image for the device at build time of the code image. Some approaches to code diversity may create a different code image for each device model of a particular device.

In contrast, examples described herein may implement a higher level of code diversity with multiple distinct code images for each device model deployed in operation (subsequent to build time). As used herein, a code image may include binary code that may be installed on a device on a computing network. The code image may include binary code such as firmware or software. The binary code may include a collection of computer instructions executable by a processor. The binary code may, as a result, have or be associated with a functionality defined by the actions resulting from execution of the computer instructions. The code image may also include an image signature, shell scripts, configuration data files, other initialization data used by the device, etc.

Implementing a code diversity strategy may involve creating, storing, and/or transmitting multiple variants of the code image. For example, a code image may have a particular size. For example, a code image may be one hundred megabytes, ten thousand code images, 1 terabyte, etc. In an example where the code image is one hundred megabytes, storage of ten thousand diverse code images would consume one terabyte of storage space per release of diversified code images. Transmission times for such a release may be dependent on the size of the release. Larger releases may utilize greater periods of time to complete transmission.

Transmitting variants of portions of the code image, in accordance with the disclosure, may implement a code diversity strategy including transmitting a compete code package and a plurality of variants of portions of the code package to be iteratively swapped with corresponding portions of the complete code package in order to generate a plurality of package variants. Since each variant of the first portion of the code package does not also include a second portion of the code package present in the complete code package a data storage and/or data transmission savings may be realized.

Figure 1:
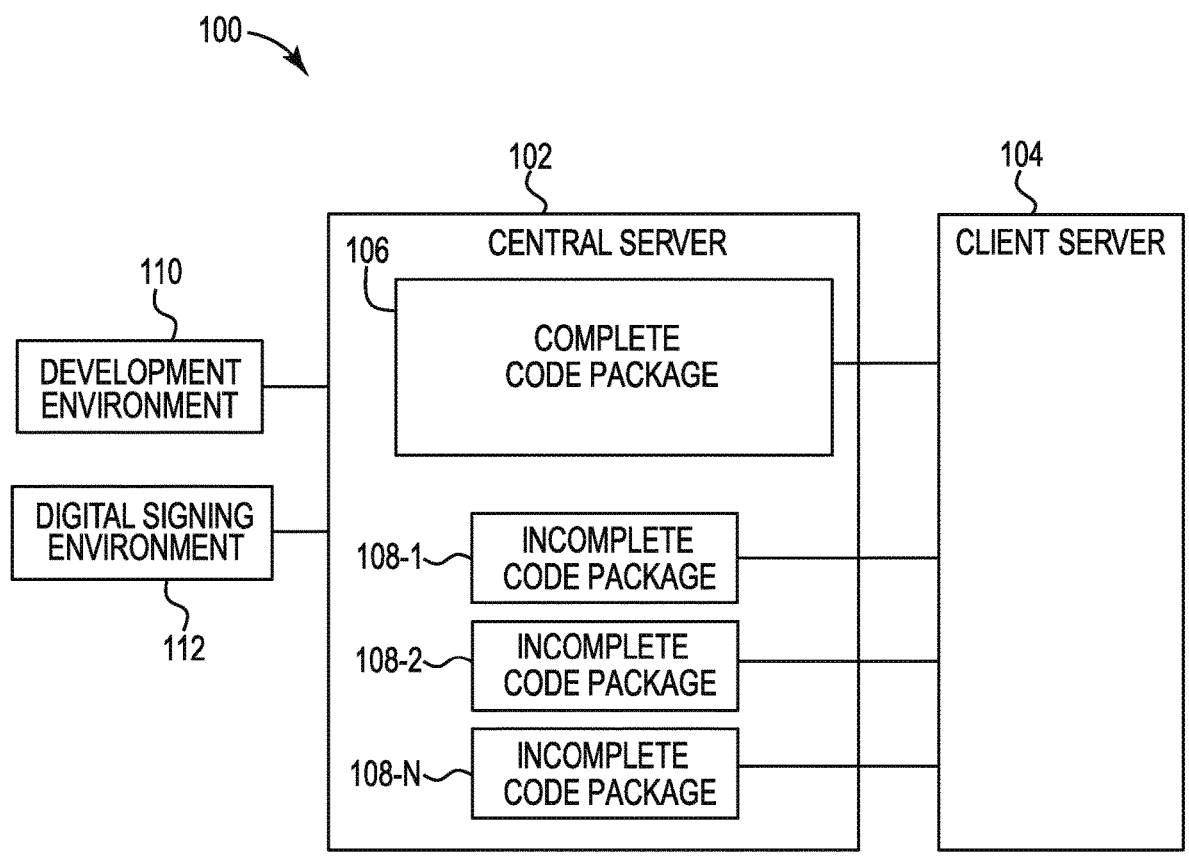
FIG. 1 illustrates a diagram of an example of a system for code package variants according to the disclosure.

FIG. 1 illustrates a diagram of a system 100 for transmission of code package variants, according to the present disclosure. As used herein, a code package may include a code image. A code package may include a code image that is software and/or firmware code image for a client device. For example, the code package may include a software and/or firmware update for printing devices managed by a client server.

A code package may include a plurality of distinct and/or separate images, bundles or package files. The package files may correspond to individual components, functions, application-specific integrated circuits (ASICS), and/or processors of a client device. For example, the client device may include distinct components, functions, ASICS, and/or processors that control the print engine of a printer, manage a control panel of a printer, manage an embedded fax of a printer, manage a scanner of a printer, manage a paper handling mechanism of a printer, manage a bin of a printer, manage a tray of a printer, manage a stapler of a printer, and/or manage a finisher of a printer. The package files may include code corresponding to each of these distinct components, functions, ASICS, and/or processors. The code package may include separate package files for application code, connectivity/networking firmware, operating system firmware, print engine firmware, and/or other component firmware for a client device.

The system 100 may include a computing system associated with developing, building, testing, and/or deploying code packages. The system 100 may include a central server 102. The central server 102 may include a server associated with developing, building, testing, and/or deploying code packages. The central server 102 may transmit data to and/or receive data from a separate computing system associated with developing, building, testing, and/or deploying code packages. The central server 102 may include a computing system that provides service such as client device firmware updates to client servers 104. The central server 102 may include a plurality of code packages that may be utilized by a plurality of client servers 104 and/or client devices. For example, a central server 102 may be associated with a manufacturer and/or service provider of client devices and may be utilized to deploy firmware updates associated with the client devices. The central server 102 may be a web server associated with a website that is utilized to communicate with client devices and/or to deliver firmware updates to a client server 104 managing the client devices. The central server 102 may be a file server for serving files (e.g., package files, code packages, etc.). The central server 102 may include a repository of files stored in a shared storage location such as a web services storage location.

The system 100 may include a development environment 110 for developing the package files. The central server 102 may include a development environment 110 for developing the package files. The central server 102 may transmit data to and/or receive data from a separate computing system associated with a development environment 110 for developing the package files. The central server 102 may include a post-processing environment to run post-processing software on the package files to create binary code variants of the package files that are functionally equivalent. The central server 102 may transmit data to and/or receive data from a separate computing system associated with a post-processing environment to run post-processing software on the package files to create binary code variants of the package files that are functionally equivalent.

The system 100 may include a client server 104. A client server 104 may include a server and/or a device management tool for managing a plurality of client devices. The client server 104 may include a computing system, on a client side of a client/server software architecture, which manages a plurality of client devices such as enterprise multi-function printers on a client network.

The client server 104 may communicate with the central server 102 over a computer network such as a local area network (LAN) or a wide-area network (WAN), such as the Internet. The client server 104 may send and/or receive various commands, requests, and files (e.g., package files, code packages, etc.) back and forth with the central server 102. The client server 104 may include a client device management tool that administrates the client devices, manages requests for transmission of the complete code package 106 and incomplete code packages 108-1, 108-2 . . . 108-N, manages receipt of the complete code package 106 and incomplete code packages 108-1 . . . 108-N, and/or manages distribution of the complete code package 106 and complete code package variants to the devices.

The system 100 may include components of a development environment 110 for building a complete code package 106 and incomplete code packages 108-1 . . . 108-N. The central server 102 may include components of a development environment 110 for building a complete code package 106 and incomplete code packages 108-1 . . . 108-N. The central server 102 may transmit data to and/or receive data from a separate computing system associated with a development environment 110 for building a complete code package 106 and incomplete code packages 108-1 . . . 108-N. The development environment 110 may include computing components to build package file constituents of the complete code package 106 and incomplete code packages 108-1 . . . 108-N. As described above, a code package may include a plurality of package files corresponding to a firmware update. The development environment 110 may include computing components to build the code images of the package files.

The system 100 may include a post-processing component to generate a plurality of variants of a first portion of a code package. The central server 102 may also include post-processing components. The central server 102 may transmit data to and/or receive data from a separate computing system associated with include post-processing components. For example, the post-processing components may include post-processing software to generate a plurality of variants of a first portion of a code package. The first portion of the code package may be a package file corresponding to the operating system firmware bundle portion (e.g., an OS package) of the code package. For example, if the code package is targeting a device running Windows CE the first portion may be a Windows CE operating system firmware package file.

The post-processing component may operate on the OS package during the build process. The post-processing component may process the OS package file to generate the plurality of variants of the OS package file. The variants of the first portion of the code package may be binary code variants of the first portion. For example, the variants may be OS package variants that have distinct binary code from the OS package file and from one another. The first portion and the variants of the first portion may, despite being binary code variants, be functionally equivalent with regard to an end effect of their execution on the client device.

Variants of the first portion of the code package may be generated by processing an original first portion. For example, an original OS package file may be built. Variants of the OS package file may be generated by randomization of the library (e.g., dynamic link library blocks), function blocks, and/or sub-function blocks within the original OS package file. Each variant of a plurality of variants may be a binary code variant that is functionally equivalent but contains different binary code than the other variants of the plurality of variants The code variability between the first portion and the plurality of variants and the code variability among the plurality of variants of the first portion may improve the security strength of a code package. For example, a code injection attack successfully targeting one variant of the first portion is far less likely to be successful on another variant with a distinct binary code image.

The variants of the first portion may be utilized as incomplete code packages 108-1 . . . 108-N. An incomplete code package 108-1 . . . 108-N may include a first portion variant such as a variant of an OS package. The incomplete code packages 108-1 . . . 108-N may exclude other portions present in the complete code package 106, such as the other package files included in the complete code package 106. The incomplete code packages 108-1 . . . 108-N may be limited to the binary code variants of the OS package file of a firmware update.

The system 100 may include a digital signing environment 112 to create a distinct digital signature for code packages. The digital signing environment 112 may be located on a server separate from the central server and maintained in a controlled environment. The digital signing environment 112 may be utilized to create a distinct digital signature for a complete code package 106. A digital signature on a software and/or firmware code image may prevent tampering with the code image and allow authentication of the software and/or firmware code image as the authentic code image built by the originator. Creating the digital signature may include processing the complete code package 106 with a hardware security module that contains a private key. A hash may be calculated on the complete code package 106 and/or the package file constituents of the code package 106. The private key may be used to calculate a digital signature value based on the hash. The resulting digital signature may then be appended to the complete code package 106 (e.g., appended at the client server). As a result, the complete code package 106 may include a plurality of package files and an appended digital signature.

The digital signing environment 112 may be utilized to create a distinct digital signature for each variant of a plurality of variants of the first portion of the code package with a same second portion as utilized in the complete code package 106. The second portion of the code package may include the portion of the code package 106 excluding the first portion. For example, the second portion may include the package files of the complete code package 106 other than the OS package file that was processed by the post-processing software to generate first portion variants. The second portion of the complete code package 106 may exclude the digital signature appended to the complete code package 106.

The digital signing environment 112 may create a digital signature for each of the first portion variants by processing the first portion variant and the second portion of the complete code package 106 with a hardware security module that contains a private key. A hash may be calculated on the first portion variant and the second portion of the code package 106 and/or the package files thereof. The private key may be used to calculate a digital signature value based on the hash. The resulting digital signature may then be appended to the corresponding incomplete code package 108-1 . . . 108-N. An incomplete code package 108-1 . . . 108-N may include a variant of a first portion of the complete code package 106 and a corresponding digital signature appended to the incomplete code package 108-1 . . . 108-N, but the incomplete code package 108-1 . . . 108-N may exclude the second portion of the complete code package 106 despite including an appended digital signature that is based on hash calculated on the variant of the first portion and the second portion.

The central server 102 may transmit files to the client server 104 across a network. For example, the central server 102 may transmit the complete code package 106 to the client server 104. Transmitting the complete code package 106 may include transmitting a firmware code image including various package files. Transmitting the complete code package 106 may include transmitting a variant of the plurality of variants of the first portion of the code package. For example, transmitting the complete code package 160 may include transmitting the variant of the plurality of variants of the first portion of the code package that is the original first portion built during the build process and the basis for the other first portion variants. Transmitting the variant of the plurality of variants of the first portion may include transmitting a package file such as an OS package file.

Transmitting the complete code package 106 may include transmitting a second portion of a code package. Transmitting the second portion may include transmitting portions of a firmware update other than the first portion. Transmitting the second portion may include transmitting the remaining package files, that when added with the first portion variant, make up an entire firmware update release. For example, transmitting the second portion may include transmitting package files other than the OS package file that together with the OS package file make up the entirety of package files associated with a firmware update release for a client device.

Transmitting the complete code package 106 may include transmitting the digital signature corresponding to the first and second portions of the code package. For example, transmitting the digital signature may include transmitting a digital signature from a hash calculated on the first portion and the second portion of the complete code package 106.

The central server 102 may transmit the incomplete code packages 108-1 . . . 108-N to the client server 104. Transmitting the incomplete code package 108-1 . . . 108-N may include transmitting a remainder of the plurality of variants of the first portion of the code package. Transmitting the remainder of the plurality of variants of the first portion of the code package may include transmitting the binary code variants of the OS package file, other than the original OS package file subjected to post-processing to generate binary variants thereof. For example, a central server 106 may build an original OS package file that will be incorporated into the complete code package 160. Additionally, the central server may generate three binary code variants of the original OS package file, which are utilized to create three incomplete code packages 108-1 . . . 108-N. In such an example, transmitting the remainder of the plurality of variants of the first portion of the code package may include transmitting the three binary code variants of the original OS package file.

Additionally, transmitting the incomplete code packages 108-1 . . . 108-N to the client server 104 may include transmitting the digital signatures of each of the remainder of the plurality of variants. For example, transmitting the incomplete code packages 108-1 . . . 108-N may include transmitting a digital signature corresponding to a particular variant of the first portion appended onto the incomplete particular code package associated with the particular variant.

Transmitting the incomplete code packages 108-1 . . . 108-N may include transmitting the remainder of the plurality of variants of the first portion of the code package, without the second portion of the code package, and the digital signatures of each of the remainder of the plurality of variants. For example, transmitting the incomplete code packages 108-1 . . . 108-N may include transmitting OS package file variants and their corresponding digital signature, based on a hash calculated from the OS package file variant and the remaining non-OS package files of the firmware update, without including the remaining non-OS package files of the firmware update. Therefore, the incomplete code packages 108-1 . . . 108-N may be smaller than the complete code package 106, since the complete code package 106 may include the remaining non-OS package files of the firmware update.

The client server 104 may receive the complete code package 106 and/or the incomplete code packages 108-1 . . . 108-N. The client server 104 may generate a plurality of complete code package variants utilizing the complete code package 106 and the plurality of incomplete code packages 108-1 . . . 108-N. The client server 104 may install the plurality of complete code package variants in the client devices. Each of the client devices of the plurality of client devices managed by the client server 104 may receive a complete code package variant comprising the same second portion of the code package and a distinct variant of the plurality of variants of the first portion of the code package from the client server 104.

Figure 2:
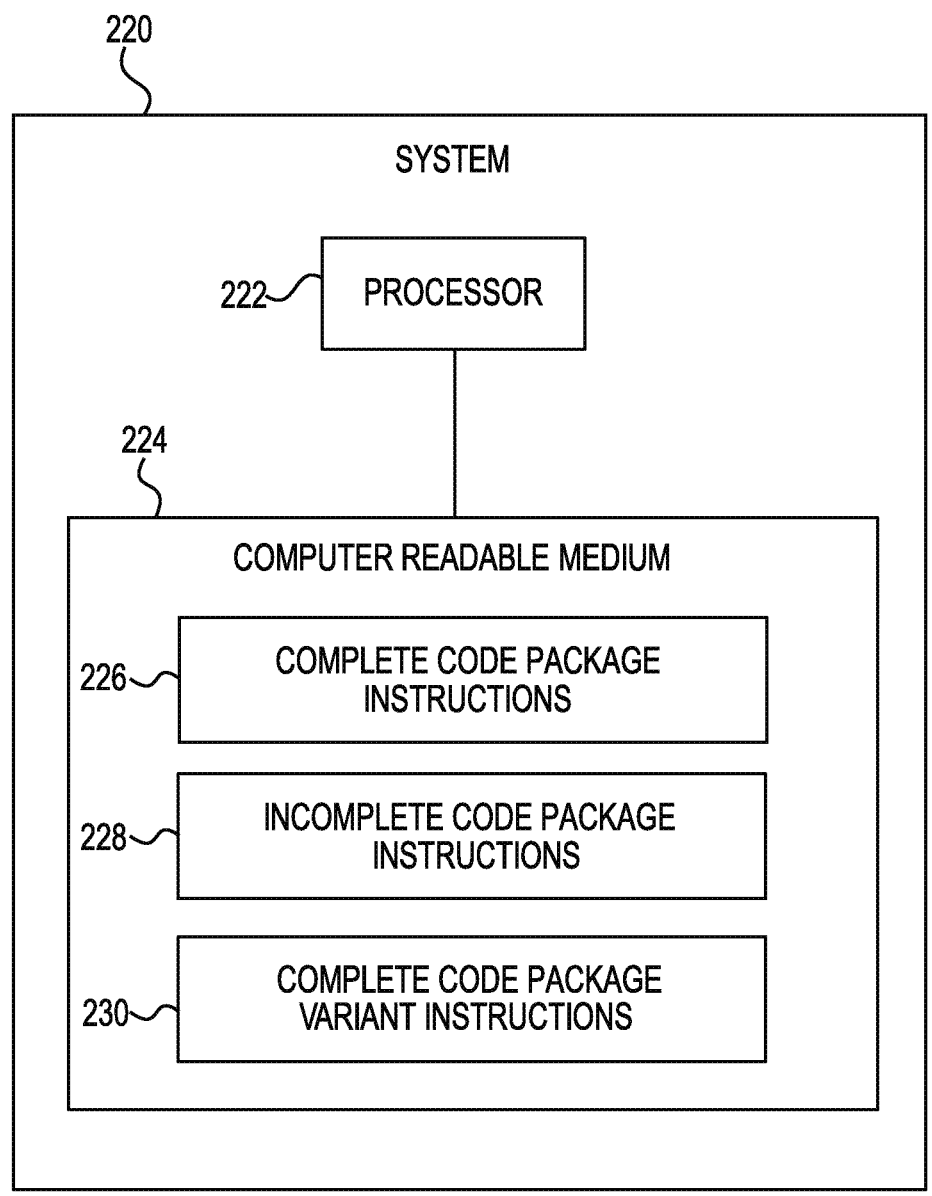
FIG. 2 is a block diagram of an example of a system for code package variants according to the disclosure.

FIG. 2 is a block diagram of an example system 220 for code package variants, according to the present disclosure. System 220 may be the same as or different than, system 100 illustrated in FIG. 1. System 220 may include at least one computing device that is capable of communicating with at least one remote system. In the example of FIG. 2, system 220 includes a processor 222 and a computer-readable medium 224. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 222 may be a central processing unit (CPUs), a microprocessor, and/or other hardware devices suitable for retrieval and execution of instructions stored in computer-readable medium 224. In the particular example shown in FIG. 2, processor 222 may receive, determine, and send instructions 226, 228, and 230 for transmitting code package variants. As an alternative or in addition to retrieving and executing instructions, processor 222 may include an electronic circuit comprising a number of electronic components for performing the functionality of an instruction in computer-readable medium 224. With respect to the executable instruction representations (e.g., boxes) described and shown herein, it should be understood that part or all of the executable instructions and/or electronic circuits included within a particular box and/or may be included in a different box shown in the figures or in a different box not shown.

Computer-readable medium 224 may be any electronic, magnetic, optical, or other physical storage device that stores executable instructions. Thus, computer-readable medium 224 may be, for example, Random Access Memory (RAM), an Electrically-Erasable Programmable Read-Only Memory (EEPROM), a storage drive, an optical disc, and the like. Computer-readable medium 224 may be disposed within system 220, as shown in FIG. 2. In this situation, the executable instructions may be "installed" on the system 220. Additionally and/or alternatively, computer-readable medium 224 may be a portable, external or remote storage medium, for example, that allows system 220 to download the instructions from the portable/external/remote storage medium. In this situation, the executable instructions may be part of an "installation package". As described herein, computer-readable medium 224 may be encoded with executable instructions for scanning with destination marks.

Referring to FIG. 2, complete code package instructions 226, when executed by a processor (e.g., 222), may cause system 220 to receive a complete code package comprising a first portion, a second portion, and a digital signature corresponding to the complete code package. The complete code package may be received at a client server and may be received from a central server. The complete code package may include a firmware and/or software update for a plurality of devices managed by the client server. The complete code package may include a plurality of package files that cumulatively make up the firmware and/or software update.

The complete code package may be made up of at least two portions. The first portion may include a specific package file that is targeted for the introduction of binary code variation. For example, the first portion may be an OS package file associated with an operating system of a targeted client device (e.g., a particular type of client device, a client device model, a client device running particular software, etc.). The first portion may include the operating system, device drivers, kernel libraries, and/or other foundational portions of firmware of the targeted client device.

The second portion may include other package files than the specific package file targeted for the introduction of binary code variation. For example, the second portion may be a plurality of package files respectively associated with application code, connectivity/networking firmware, engine firmware, and/or other client device components. The second component may include the remaining package files other than the OS package file that make up a firmware update release.

Incomplete code package instructions 228, when executed by a processor (e.g., 222), may cause system 220 to receive a plurality of incomplete code packages wherein each incomplete code package of the plurality includes a respective variant of a plurality of a plurality of variants of the first portion, without the second portion, and a digital signature corresponding to the variant of the first portion and the second portion. The incomplete code packages may be smaller than the complete code package since the incomplete code packages do not include the second portion. For example, the complete code package may have a first data size while the first portion alone and/or the variants of the first portion of a code package may be an OS package file of a second data size that is a fraction of the first data size (e.g., 10%, 15%, etc.). For example, if the first data size is one hundred fifty megabytes and the second data size is twenty megabytes, utilizing the system 220 including sending a complete code package and ten thousand first portion variant incomplete code packages may involve transmitting and/or receiving two hundred gigabytes of first portion variants and a one hundred fifty megabytes complete code package. In contrast, sending each of the same ten thousand first portion variants along with the second portion would involve transmitting and/or receiving one and a half terabytes. The system 220 may produce an eighty-seven percent reduction in transmission time and/or data storage on a central server or client server.

Complete code package variant instructions 230, when executed by a processor (e.g., 222), may cause system 220 to generate a plurality of complete code package variants utilizing the complete code package and the plurality of incomplete code packages. The variant instructions 230, when executed by a processor (e.g., 222), may cause system 220 to generate a complete code package variant of the plurality of complete code packages variants by swapping out the first portion and the digital signature corresponding to the complete code package with an incomplete code package of the plurality of incomplete code packages. Therefore, the system 220 may be able to construct multiple complete code package variants having distinct first portion variants, the same second portion, and a digital signature corresponding to the unique distinct first portion variant and same second portion combination by utilizing the above described swap. The multiple complete variants may be generated by reusing the second portion of the complete code package and iteratively replacing the signature and distinct first portion variant with another of the plurality of distinct first portion variant and corresponding digital signature combinations. Continuing the example given above with ten thousand first portion variants, the system 220 can produce ten thousand and one distinct complete code package variants utilizing the one complete code package and the ten thousand incomplete code packages. The instructions to construct the code package variants may include processor executable instructions loaded onto the client server managing a plurality of client devices such as printers.

Variant installation instructions (not shown), when executed by a processor (e.g., 222), may cause system 220 to install the plurality of complete code package variants in client devices. For example, a client server may distribute the plurality of complete code package variants to a plurality of corresponding devices managed by the client server. The complete code package variants may be installed on the client devices in a standard fashion that does not involve additional changes to the client device (e.g., does not employ additional firmware changes to the client device). For example, from a client device's perspective, the complete code package variant may be installed and function just as though the first portion and the second portion of the code package variants were received together as one code package variant.

Figure 3:
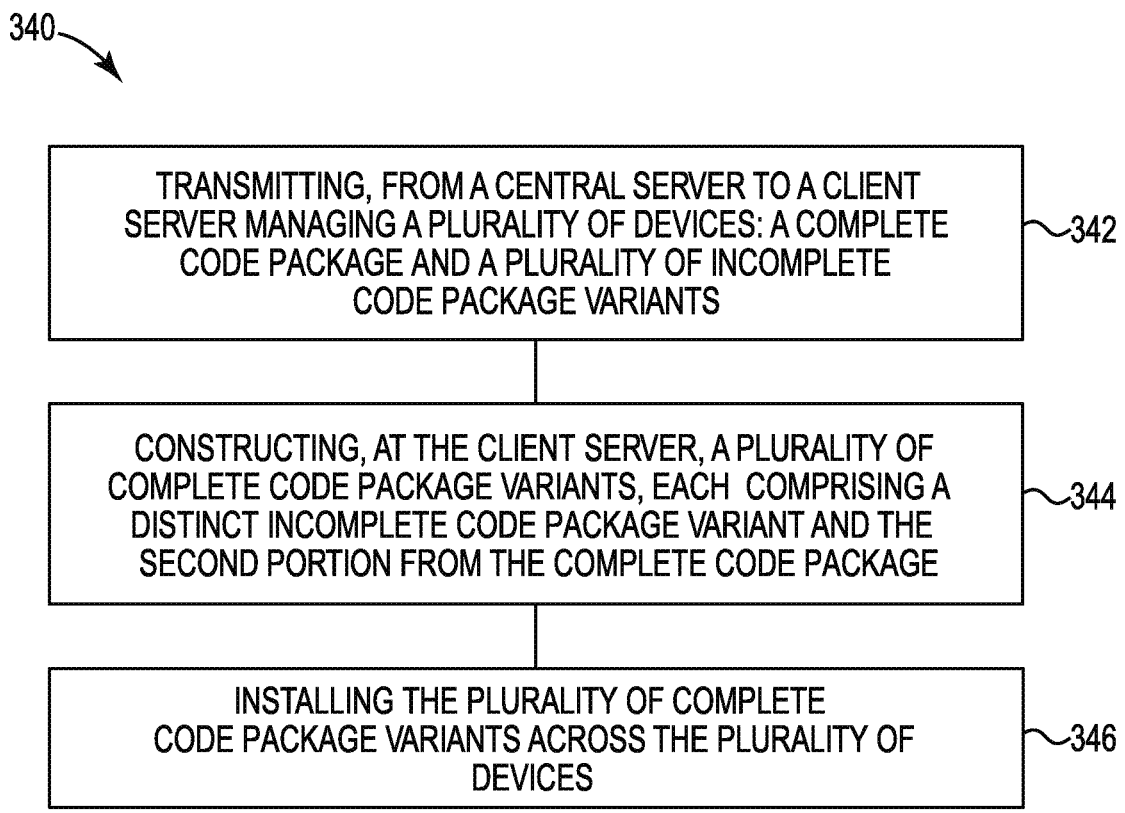
FIG. 3 illustrates an example method for code package variants, according to the disclosure.

FIG. 3 illustrates an example method 340 for code package variants, according to the present disclosure. At 342, the method 340 may include transmitting, from a central server to a client server managing a plurality of devices, a complete code package. The complete code package may include a first portion, a second portion, and a digital signature corresponding to the complete code package.

At 342, the method 340 may further include transmitting, from a central server to a client server managing a plurality of devices, a plurality of incomplete code package variants. Each incomplete code package variant of the plurality of incomplete code package variants may include a respective variant of a plurality of variants of the first portion, without the second portion, and a digital signature corresponding to the variant of the plurality of variants of the first portion and the second portion.

The transmission of the complete code package and the plurality of incomplete code package variants may be performed in response to receiving, at the central server, a request for a firmware update to a plurality of devices managed by a client server. For example, the client server may transmit a request to the central server for a firmware update to client devices that it is managing. It may be determined, at the central server, the quantity of incomplete code packages for transmission to the client server based on the request. The central server may transmit the complete code packages and the incomplete code packages to the client server upon receiving the request.

At 344, the method 340 may include constructing, at the client server, a plurality of complete code package variants, wherein each complete code package variant of the plurality of complete code package variants includes a distinct incomplete code package variant and the second portion from the complete code package. The distinct incomplete code package variants may include binary code variants of an OS package file of a firmware update that are functionally equivalent. The second portion can include a plurality of package files other than the OS package file that are part of the firmware update. The incomplete code package variants, along with corresponding digital signatures, may be iteratively substituted for the first portion and the digital signature present in the complete code package.

At 346, the method 340 may include installing the plurality of complete code package variants across the plurality of devices. Installing the plurality of complete code package variants may include installing functionally equivalent complete code packages having distinct binary code images across client devices of the same model managed by the client server.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system comprising:
  a client server;
  a development environment to:
    generate a plurality of functionally equivalent variants of a first portion of a code package, wherein each of the plurality of functionally equivalent variants of the first portion of the code package comprises a different binary code;
  a digital signing environment to:
    create a distinct digital signature for each functionally equivalent variant of the plurality of functionally equivalent variants of the first portion of the code package based on a combination of:
      a binary code of a particular functionally equivalent variant of the plurality of functionally equivalent variants of the first portion of the code being digitally signed,
      with a second portion of the code package to be combined with each variant of the plurality of variants of the first portion of the code package; and a
  central server to:
    transmit to the client server a complete code package composed of a variant of the first portion of the code package, from among the plurality of variants of the first portion of the code package, along with the second portion of the code package and a digital signature corresponding to the variant of the first portion of the code package and the second portion of the code package; and
    transmit to the client server, without the second portion of the code package, an incomplete code package comprising variants of the first portion of the code package, from among the plurality of variants of the first portion of the code package, that are not included in the complete code package and digital signatures of each of the variants of the first portion of the code package not transmitted as the portion of the complete code package.

2. The system of claim 1, wherein the complete code package includes a firmware code image.

3. The system of claim 1, wherein each client device of a plurality of client devices managed by the client server is to receive a code package comprising the second portion of the code package transmitted as the second portion of the complete code package and a distinct variant from the variants of the first portion of the code package not transmitted as the portion of the complete code package.

4. The system of claim 1, wherein the code package comprises package files.

5. The system of claim 4, wherein the first portion of the code package comprises an operating system package file.

6. The system of claim 1, wherein the plurality of variants of the first portion of the code package are generated by randomizing dynamic link library blocks, function blocks, and sub-function blocks within an operating system package file portion of the code package.

7. A non-transitory computer-readable medium containing instructions executable by a processor to cause the processor to:
  receive a complete code package comprising a first portion of code, a second portion of code, and a digital signature corresponding to a combination of the first portion of code and the second portion of code of the complete code package;

receive a plurality of incomplete code packages wherein each incomplete code package of the plurality of incomplete code packages includes a respective variant of the first portion of code selected from a plurality of variants of the first portion of code, without the second portion of code, and a digital signature corresponding to a combination of the respective variant of the first portion of the code and the second portion of code, wherein the digital signature is created based on a binary code of the respective variant of the first portion of the code being digitally signed and the second portion of the code package to be combined with each of the plurality of variants of the first portion of the code, wherein each of the plurality of variants of the first portion of code includes a distinct binary code and wherein the plurality of variants of the first portion of code and the first portion of code are functionally equivalent; and generate a plurality of complete code package variants utilizing the complete code package and the plurality of incomplete code packages.

8. The medium of claim 7, wherein the plurality of variants of the first portion of code are generated by randomizing library blocks, function blocks, and sub-function blocks within an operating system package file portion of the code package.

9. The medium of claim 7, further including instructions to generate a complete code package variant of the plurality of complete code packages variants by swapping out the first portion of code and the digital signature corresponding to the complete code package with an incomplete code package of the plurality of incomplete code packages.

10. The medium of claim 9, wherein each of the plurality of incomplete code packages are smaller than the complete code package.

11. A method comprising:
transmitting, from a central server to a client server managing a plurality of devices:
a complete code package comprising a first portion of code, a second portion of code, and a digital signature corresponding to a combination of the first portion of code and the second portion of code of the complete code package;

a plurality of incomplete code package variants, wherein each incomplete code package variant of the plurality of incomplete code package variants comprises a respective variant of the first portion of code selected from a plurality of variants of the first portion of code, without the second portion of code, and a digital signature corresponding to a combination of the respective variant of the first portion of the code and the second portion of code, wherein the digital signature is created based on a binary code of the respective variant of the first portion of the code being digitally signed and the second portion of code to be combined with each of the plurality of variants of the first portion of the code, wherein each of the plurality of variants of the first portion of code includes a distinct binary code and wherein the plurality of variants of the first portion of code and the first portion of code are functionally equivalent;

constructing, at the client server, a plurality of complete code package variants, wherein each complete code package variant of the plurality of complete code package variants comprises a distinct incomplete code package variant and the second portion of code from the complete code package; and installing the plurality of complete code package variants across the plurality of devices.

12. The method of claim 11, comprising receiving, at the central server, a request for a firmware update to the plurality of devices and wherein the transmitting is performed responsive to receiving the request.

13. The method of claim 12, comprising determining, at the central server, a quantity of incomplete code package variants for transmission based on a code diversity level specified in the request.

14. The method of claim 11, wherein each complete code package variant of the plurality of complete code package variants is functionally equivalent and includes a distinct digital signature.

* * * * *